Dec. 15, 1931.  C. K. HUTHSING  1,836,716
HOSE COUPLING
Filed Nov. 6, 1930
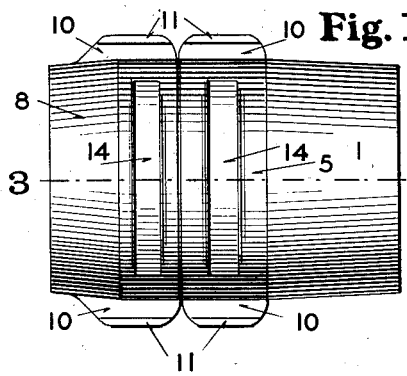
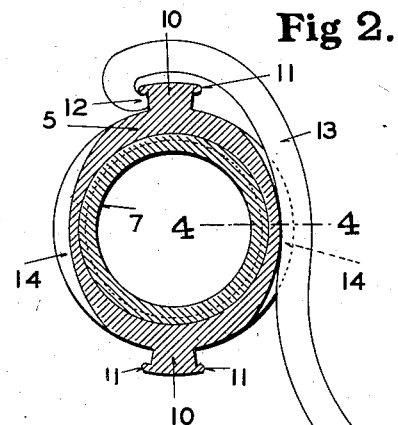
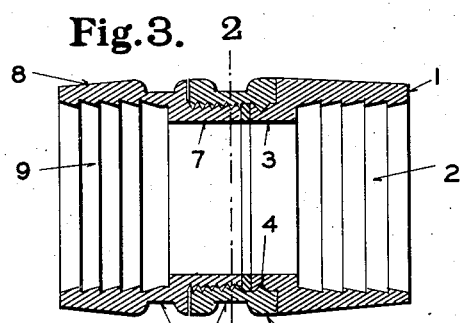
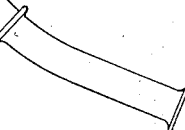
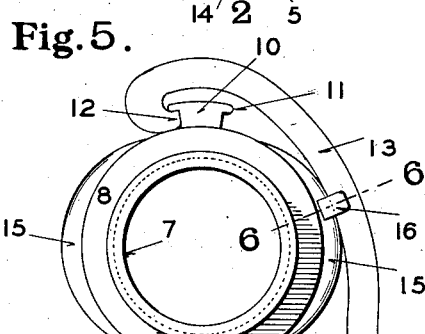
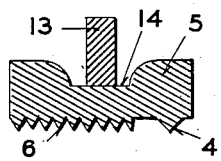
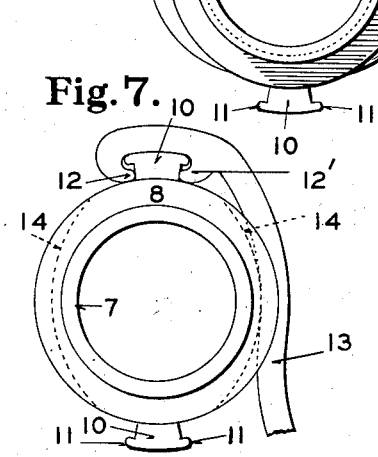
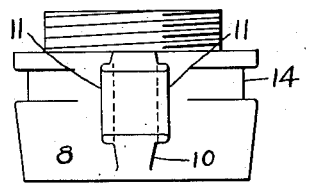
Inventor
C. K. Huthsing
By E. G. Huffman
Att'y.

Patented Dec. 15, 1931

1,836,716

UNITED STATES PATENT OFFICE

CHARLES K. HUTHSING, OF ST. LOUIS COUNTY, MISSOURI

HOSE COUPLING

Application filed November 6, 1930. Serial No. 493,740.

My invention relates to a hose coupling and particularly to that form of coupling used to connect the sections of a fire hose. Such a fire hose coupling comprises a pair of sleeves secured to the sections of hose and an intermediate collar swiveled to one of said sleeves and having threaded connection with the other sleeve, the collar and threaded sleeve being drawn into tight engagement by the use of a spanner wrench.

The object of my invention is to so construct the coupling as to provide means for preventing the slipping of the spanner wrench either radially from the lug with which it is in engagement, or laterally along the periphery of the coupling so as to avoid delay in making the connection, which operation often occurs at a time when the slightest tardiness may prove dangerous or even disastrous.

In the accompanying drawings, which illustrate two forms of hose coupling made in accordance with my invention, Figure 1 is a side view of one form; Figure 2 is a section taken on the line 2—2 of Figure 3, a spanner wrench being shown cooperating with the coupling; Figure 3 is a longitudinal section taken on the line 3—3 of Figure 1; Figure 4 is an enlarged section taken on the line 4—4 of Figure 2, the sleeves being omitted; Figure 5 is an end view of one of the sleeves, showing a modification, together with a special form of spanner wrench adapted for use with such modified form; Figure 6 is an enlarged section taken on the line 6—6 of Figure 5; Figure 7 is a view showing a double claw wrench applied to my coupling; and Figure 8 is a view of one of the connector elements showing a top plan view of one of its wrench engaging lugs.

Referring first to Figures 1 to 8, 1 indicates hose connector element in the form of a sleeve having its interior surface provided with serrations 2 to facilitate its attachment to one end of a section of fire hose. Formed on the end of the sleeve 1 is a flange 3 in which is formed an annular groove to receive an annular ridge 4 on a collar 5, thus providing a swivel joint between the sleeve and collar. On the inner surface of the collar are screw threads 6 engaging with corresponding threads on the periphery of a nipple 7 on the end of a second hose connector element in the form of a sleeve 8. The interior of the sleeve 8 is provided with serrations 9 to facilitate its attachment to one end of a section of hose.

Formed at diametrically opposite points on the periphery of the collar are lugs 10 each provided at each side with an overhanging lip 11 forming a substantially square shoulder for engagement with the correspondingly shaped claw 12 of a spanner wrench 13. This construction effectively prevents the spanner from slipping out of engagement with the lug by movement in a radial direction, and provides the lug with a relatively wide upper surface without increasing the width of the base beyond that required to provide the necessary strength. It will be understood that a lug relatively wide at the outer end will be less likely to injure the hose by contact therewith in service and less likely to catch on other objects. In order to prevent the wrench from slipping laterally on the periphery of the coupling, I form in the periphery of the collar at opposite sides thereof a pair of wrench engaging grooves 14 which effectively check such lateral slipping either when the wrench is in the position shown in Figure 2 to tighten the coupling, or in the reverse position to loosen it. While my device is operative with the lugs and grooves in the collar only, as the sleeve 8 may be held against rotation by grasping the hose attached thereto, this requires the cooperation of two or more firemen to manipulate the coupling. I therefore prefer to provide the sleeve 8 with lugs 10 and grooves 14, as shown, so that one fireman may tighten or loosen the coupling by applying two wrenches in reverse position.

In Figures 5 and 6 I have shown a modification in which the grooves 14 are replaced by ribs 15 similarly positioned on the periphery of the collar and sleeve. When this form of coupling is used a special wrench is required, having on opposite sides a pair of projections 16 which straddle the rib, as best shown in Figure 6. This construction performs the same function in preventing lateral movement of the wrench as the grooves shown in Figures 1 to 4.

Another advantage of my improved form of lug with double overhanging lips is that it is well adapted to cooperate with a spanner wrench having a second claw 12', as shown in Figure 7, the two claws embracing the lug and positively preventing the wrench from accidental disengagement during the operation of tightening the connection. This form of wrench must, of course, be applied to the coupling by a lateral movement and while it should be a fairly snug fit over the lug, sufficient play must be provided to allow the body of the wrench to pass over the full diameter of the coupling and into the groove 14, or in case such double claw wrench is used with the form of coupling shown in Figure 5, to allow the lugs 16 to pass over the rib 15.

Having fully described my invention, what I claim as new and desire to secure by Letters Patent of the United States is:

1. Means for joining two lengths of hose which comprises two elements adapted for threaded engagement with each other, one of said elements being provided with means forming an abutment engageable by a spanner wrench for rotating said element, and with means positioned at a point spaced circumferentially from the abutment and arranged to cooperate with the wrench at a point intermediate its length to prevent lateral movement of the wrench.

2. The combination with a pair of hose connectors, of a member swiveled to one of said connectors and having threaded connection with the other, a lug on said member for engagement with the claw of a spanner wrench, and means positioned at a point spaced circumferentially from the lug for engaging with the wrench to prevent its lateral movement.

3. The combination with a pair of hose connectors, of a member swiveled to one of said connectors and having threaded engagement with the other, a lug on said member for engagement with the claw of a spanner wrench, and a circumferentially extending groove in the periphery of said member for engagement with the wrench at a point intermediate its ends to prevent its lateral movement.

4. The combination with a pair of hose connectors, of a member swiveled to one of said connectors and having threaded engagement with the other, a lug on said member for engagement with the claw of a spanner wrench, and a circumferentially extending rib on the periphery of said member for engagement with the wrench at a point intermediate its ends to prevent its lateral movement.

5. The combination with a pair of hose connectors, of an intermediate member swiveled to one of said connectors and having threaded engagement with the other, said member carrying a lug, said lug being provided at one side with an overhanging lip forming a substantially square shoulder for engagement with the claw of a spanner wrench, and means positioned at a point spaced circumferentially from the lug and arranged to cooperate with the wrench at a point intermediate its length to prevent lateral movement of the wrench.

6. Conduit connecting means comprising a rotatable element having a lug, the top of which is provided with a lateral extension at each side thereof projecting beyond the base and forming overhanging abutments for engagement with the claw of the spanner wrench, said rotatable element being provided with means spaced circumferentially from the lug to engage with the wrench at a point intermediate its ends to prevent its lateral movement.

7. Conduit connecting means comprising a rotatable element having a lug integral therewith adapted to be engaged with a spanner wrench and having radially extending flat side walls and angularly disposed laterally extending flanges on each side thereof, said flanges extending a substantial distance beyond the side walls of the lug, and said lug having a substantially flat relatively broad outer surface.

In testimony whereof, I hereunto affix my signature, this 4th day of November, 1930.

CHARLES K. HUTHSING.